(12) United States Patent
Kermelk et al.

(10) Patent No.: US 10,717,319 B2
(45) Date of Patent: Jul. 21, 2020

(54) VEHICLE WHEEL FOR PASSENGER CARS

(71) Applicant: Maxion Wheels Germany Holding GmbH, Königswinter (DE)

(72) Inventors: Werner Kermelk, Much (DE); Karl Rode, Königswinter (DE); Günter Stelzer, Bad Honnef (DE)

(73) Assignee: Maxion Wheels Germany Holding GmbH, Königswinter (DE)

( * ) Notice: Subject to any disclaimer, the term of this patent is extended or adjusted under 35 U.S.C. 154(b) by 0 days.

(21) Appl. No.: 16/018,251

(22) Filed: Jun. 26, 2018

(65) Prior Publication Data

US 2019/0135029 A1    May 9, 2019

Related U.S. Application Data

(63) Continuation of application No. 14/770,251, filed as application No. PCT/IB2014/059136 on Feb. 20, 2014, now Pat. No. 10,005,315.

(30) Foreign Application Priority Data

Feb. 28, 2013 (DE) .................... 20 2013 100 875 U

(51) Int. Cl.
*B60B 3/10* (2006.01)
*B60B 3/00* (2006.01)
*B60B 3/04* (2006.01)

(52) U.S. Cl.
CPC ............... *B60B 3/10* (2013.01); *B60B 3/007* (2013.01); *B60B 3/04* (2013.01);
(Continued)

(58) Field of Classification Search
CPC .............. B60B 3/04; B60B 3/10; B60B 3/007
See application file for complete search history.

(56) References Cited

U.S. PATENT DOCUMENTS 1,375,372 A    4/1921  Forsyth
6,340,210 B1   1/2002  Handa et al.
(Continued)

FOREIGN PATENT DOCUMENTS

EP    1262333 A2   12/2002
EP    1262333 B1    3/2005
(Continued)

OTHER PUBLICATIONS

Eurasian Office Action, Application No. 201591576/31 dated Mar. 14, 2017.
(Continued)

*Primary Examiner* — Kip T Kotter
(74) *Attorney, Agent, or Firm* — MacMillan, Sobanski & Todd, LLC

(57) ABSTRACT

Vehicle wheel comprising a rim part and a disc part formed from a one-piece sheet metal blank and including a central portion with bolt holes and a plurality of radially extending spoke arrangements merging into a disc edge delimiting together with the spoke arrangements ventilation apertures which extend over the region between the edge webs and the disc edge. In order to create steel wheels with four-hole fixing in which high strength and stiffness are achieved the number of spoke arrangements and of bolt holes is four and these are in each case arranged mirror-symmetrically with respect to a common radial line, with the width of each spoke arrangement narrowing radially towards the outside and each ventilation aperture extending in the circumferential direction over an arc length of more than ⅙ of the circumference of the disc part. Further, each ventilation aperture is having on a radial line a maximum radial clear width which is equal to or preferably greater than the radial width of the metal portion of the disc part on the same radial line.

8 Claims, 3 Drawing Sheets

(52) U.S. Cl.
CPC ... *B60B 2310/206* (2013.01); *B60B 2310/213* (2013.01); *B60B 2310/226* (2013.01); *B60B 2310/302* (2013.01); *B60B 2900/311* (2013.01); *B60B 2900/513* (2013.01); *B60Y 2200/11* (2013.01)

(56) References Cited

U.S. PATENT DOCUMENTS

| | | | |
|---|---|---|---|
| 7,059,685 B2 | 6/2006 | Kermelk et al. | |
| 8,454,099 B2 | 6/2013 | Sano et al. | |
| 8,882,206 B2 | 11/2014 | Nakayama et al. | |
| 9,327,547 B2 | 5/2016 | Morishita et al. | |
| 10,005,315 B2 * | 6/2018 | Kermelk | B60B 3/007 |
| 2004/0227392 A1 | 11/2004 | Coleman et al. | |
| 2006/0033380 A1 * | 2/2006 | Yamagishi | B60B 3/008 301/37.371 |
| 2007/0222279 A1 * | 9/2007 | Csapo | B60B 3/004 301/64.101 |
| 2008/0034587 A1 * | 2/2008 | McCorry | B60B 3/007 29/894.323 |
| 2010/0141022 A1 | 6/2010 | Hendel et al. | |
| 2010/0289323 A1 | 11/2010 | Sano et al. | |
| 2011/0193405 A1 | 8/2011 | Kihara et al. | |
| 2012/0217792 A1 | 8/2012 | Nakayama et al. | |
| 2013/0257139 A1 | 10/2013 | Goto | |
| 2014/0070601 A1 | 3/2014 | Morishita et al. | |

FOREIGN PATENT DOCUMENTS

| | | |
|---|---|---|
| EP | 1790499 A1 | 5/2007 |
| EP | 1782965 A1 | 9/2007 |
| EP | 2189299 A1 | 5/2010 |
| EP | 2333451 A2 | 6/2011 |
| EP | 2495110 A1 | 5/2012 |
| EP | 2828102 B1 | 12/2016 |
| FR | 2339451 A1 | 8/1977 |
| JP | 2005507334 A | 3/2005 |
| JP | 2009113798 A | 5/2009 |
| JP | 2010132279 A | 6/2010 |
| WO | 2003037651 A1 | 5/2003 |
| WO | 2011055839 A1 | 5/2011 |
| WO | 2012107989 A1 | 8/2012 |
| WO | 2012153577 A1 | 11/2012 |

OTHER PUBLICATIONS

Japanese Notice of Reasons for Rejection, Application No. 2015559579, dated Jul. 18, 2017.
Japanese Third Party Prior Art Submission, Translated in English, Application No. 2015559579, dated Jun. 22, 2017.
PCT International Search Report, Application No. PCT/IB2014/059136 filed Feb. 20, 2014, dated Jun. 24, 2014.
JP Notice of Reasons for Rejection, Application No. 2018-173830, dated Oct. 15, 2019.

\* cited by examiner

VEHICLE WHEEL FOR PASSENGER CARS

CROSS-REFERENCE TO RELATED APPLICATIONS

This application is a continuation of U.S. Ser. No. 14/770,251, filed Aug. 25, 2015, now U.S. Pat. No. 10,005,315, issued Jun. 26, 2018, the disclosures of which are incorporated herein by reference in entirety.

BACKGROUND OF THE INVENTION

The invention relates to a vehicle wheel, in particular for passenger cars, comprising a rim part for receiving a tyre and a disc part which is connected to the rim part and is formed from a one-piece sheet metal blank by forming and cutting or punching, which disc part includes a central portion having bolt holes for wheel bolts and a central aperture for a vehicle hub and a plurality of radially extending spoke arrangements, formed by shaping the sheet metal, for transmitting force between vehicle hub and rim part, each spoke arrangement being provided with a radially extending central web which merges on each side into a radially extending lateral web, bent outwardly from the plane of the central web, and then into an edge web bent back again with respect to the lateral web, the radially outer ends of the central webs and of the lateral webs merging into a circumferential annular disc edge oriented precisely parallel or substantially parallel axially to the wheel axis and connecting all the spoke arrangements to one another, which disc edge is formed integrally from the sheet metal, forms the connecting part for the connection between rim part and disc part and in each case delimits, together with the edge webs of adjacent spoke arrangements, ventilation apertures which extend over the region between the edge webs and the disc edge.

A generic vehicle wheel for passenger cars, on which the preamble of claim 1 is based, is known from EP 1 262 333 A2 of the applicant, is usually referred to commercially as a "structured wheel" and is marketed by the applicant under the trade name "Versastyle®". Through its construction this vehicle wheel, which is produced from a steel blank by shaping and has comparatively large-area ventilation apertures, can compete with aluminium wheels not only economically in terms of weight but also in terms of style, on the one hand because the wheel has a striking appearance resulting from the interplay between the multiple shaping of the spoke arrangements and the large ventilation apertures and, on the other, because different hub caps can be used with this vehicle wheel without disadvantage to the total weight of the wheel fitted with hub cap, as compared to a comparable cast-aluminium vehicle wheel.

The vehicle wheel known from EP 1 262 333 A1 forms a new type of embossed steel wheel for passenger cars which hitherto has been produced only with five bolt holes and five spoke arrangements distributed symmetrically with respect to the bolt holes. Other manufacturers have also proposed innovations to this type of vehicle wheel, as shown, for example, by U.S. Pat. No. 7,104,611 B2 or EP 1 790 499 A1, in which minimal modifications to the vehicle wheel according to EP 1 262 333 A1 are described and all of which start from this vehicle wheel as the nearest prior art.

Passenger cars, especially in the small, compact and mid-sized classes, frequently require wheels with four-hole fixing. The wheel structure according to EP 1 262 333 A2 thus gives rise to a steel vehicle wheel with four spoke arrangements and four bolt holes.

BRIEF SUMMARY OF THE INVENTION

It is a feature of the invention to create steel wheels for vehicles with four-hole fixing in which high strength and stiffness are achieved in conjunction with ventilation apertures of especially large area.

This feature is achieved according to the invention in that the number of spoke arrangements and the number of bolt holes is four and one spoke arrangement and one bolt hole are in each case arranged mirror-symmetrically with respect to a common radial line, the width of each spoke arrangement becoming constantly narrower from the central portion radially towards the outside, each ventilation aperture extending in the circumferential direction, at the narrowest point of the spoke arrangements, over an arc length of more than ⅙ of the circumference of the disc part, at least on this reference circle, and each ventilation aperture having a maximum radial clear width, on a radial line disposed midway between two adjacent spoke arrangements, which is greater than the radial width of the metal portion of the disc part on the same radial line.

In the vehicle wheel according to the invention, having four bolt holes and four spoke arrangements, each of which spoke arrangements extends in prolongation of a bolt hole, each ventilation aperture has, according to the invention, at the narrowest point of the spoke arrangements, an arc length of more than ⅙ of the circumference of the disc part on the same reference circle on which the narrowest points of the spoke arrangements lie, and at the same time each ventilation aperture extends in the radial direction over a clear width which is equal to or preferably greater than the metal portion between the centre hole and the region of the disc part bordering the ventilation aperture radially on the inside, which region is formed at this location by the convergent edge webs of the adjacent spoke arrangements. The ratio of the radial width of the metal portion of the disc part to the clear width of a ventilation aperture on the same radial line is then either approximately equal to 1 or preferably less than 1.

It is especially advantageous if the ratio of radial width to clear width, and therefore the quotient of radial width/clear width, is from 0.85 to 0.95 and preferably is 0.9±0.02.

Further preferably, the central webs of all the spoke arrangements may each extend, in a radial partial section, in a plane disposed orthogonally to the wheel axis, each partial section in turn having a length which is equal to or preferably greater than half the clear width of the ventilation apertures. The quotient of partial section/clear width is preferably from 0.6 to 0.7.

The edge webs may have a depth which, starting from a radial line bisecting a ventilation aperture midway between two adjacent spoke arrangements, at first increases continuously and then decreases continuously again. The edge webs therefore have their narrowest zones, firstly, on the radial line bisecting the ventilation apertures and, secondly, at the outer ends of the spokes.

Further advantageously, the distance between the lateral webs of a spoke arrangement, starting from the central portion in the direction of the outer spoke ends, may first narrow continuously, and then widen again. This measure also contributes, like the aforementioned measures, to improving the stiffness and load-bearing capacity of the disc part despite the large-area ventilation apertures.

It is additionally advantageous if the maximum relative deformation depth between the central web and the transition of the lateral web to the edge web, in the range of extent of the ventilation apertures, is from 10 mm to 30 mm, the minimum depth in the region of the radial partial section preferably being greater than 10 mm.

The outside edges of the edge webs bordering the ventilation aperture may be disposed, in radially outer regions of the ventilation apertures, at an angle of 6° to 10°, preferably 8°±1°, to the common radial line of bolt hole and spoke arrangement. Alternatively or additionally, the outside edges of the edge webs and of the disc edge directly bordering the ventilation aperture may be disposed, or cut off, obliquely with respect to the wheel axis.

Other advantages of this invention will become apparent to those skilled in the art from the following detailed description of the preferred embodiments, when read in light of the accompanying drawings.

DETAILED DESCRIPTION OF THE INVENTION

Figure 1:
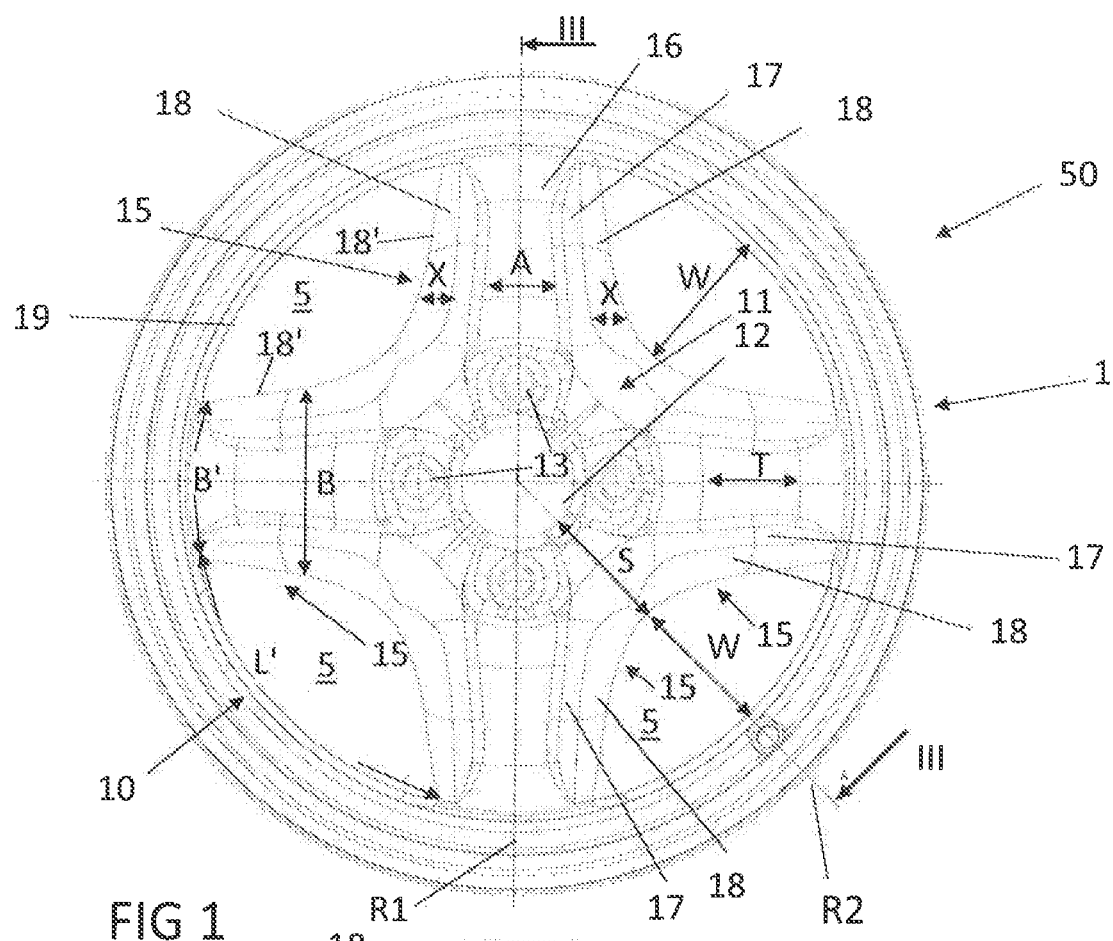
FIG. 1 shows a plan view of a vehicle wheel according to the invention in a first exemplary embodiment.
Figure 2:
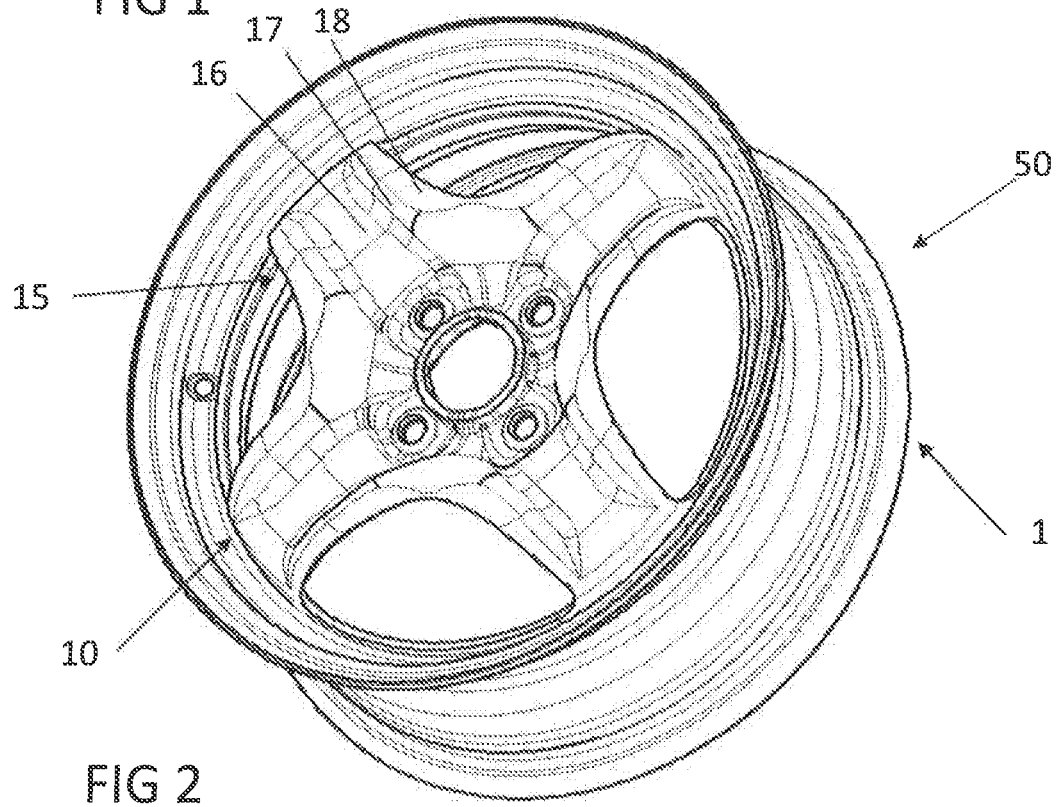
FIG. 2 shows the vehicle wheel of FIG. 1 in a perspective view.
Figure 3:
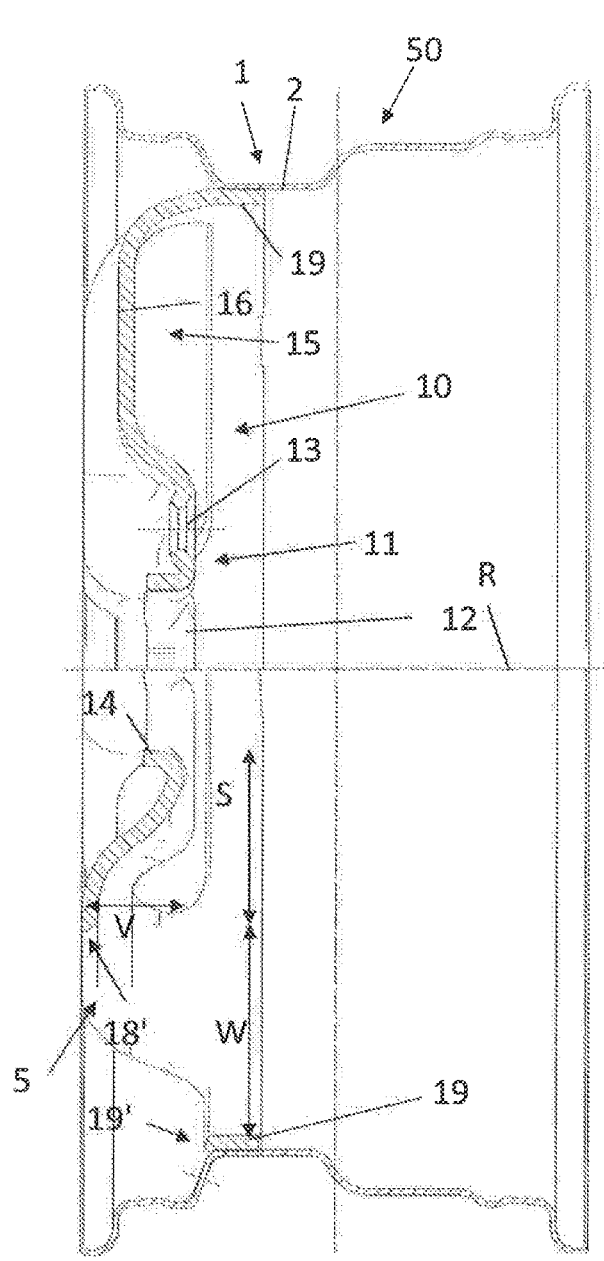
FIG. 3 shows a sectional view along III-III in FIG. 1.

In FIGS. 1 to 3, a vehicle wheel according to the invention in a first exemplary embodiment, consisting essentially of a circular rim part 1 having multiple steps, to the inner side of which a disc part 10 is fastened, is denoted as a whole by reference 50. The rim part 1, which receives a tyre (not shown), is fastened via a central portion 11 of the disc part 10 to a hub (not shown) of a vehicle (also not shown), in particular a passenger car. The rim part 1 extends in a very largely rotationally symmetrical manner around the wheel axis R, which generally coincides with the axis of the vehicle hub in the installed state of the vehicle wheel 50. In the exemplary embodiments shown, both the rim part 1 and the disc part 10 consist of respective sheet metal blanks which take on the ring shape in the case of the rim part 1 and the disc shape in that of the disc part 10 through shaping and cutting or punching, as is known in principle by the person skilled in the art. In order to fasten the vehicle wheel 1 to the vehicle hub, the central portion 11 of the disc part 10 is provided with a central aperture 12 and with four bolt holes 13 offset to one another by 90° and arranged in the central portion 11. In the exemplary embodiment shown, the central aperture 12 has an edge 14 which is bent up towards the outside of the wheel. The transmission of force between the rim part 1 carrying the tyre and the central portion 11 connected to the vehicle hub is effected via four spoke arrangements 15 formed by shaping the sheet metal and having multiple steps, each spoke arrangement 15 extending radially outwards in prolongation of one of the bolt holes 13. Each spoke arrangement 15 has a plane central web 16 which is disposed orthogonally to the wheel axis R and which, viewed in the circumferential direction, merges on each side into a lateral web 17 extending radially and bent from the plane of the central web 16 towards the outer side of the wheel, and then into an edge web 18 which is bent back again with respect to the lateral web, whereby each spoke arrangement 15 receives essentially an approximately U-shaped cross section, as is indicated schematically in FIG. 4.

As can be seen especially clearly in FIGS. 1 and 2, the width of each spoke arrangement 15 decreases from the central portion 11 radially towards the outside up to the outer ends of the spoke arrangements 15. The outer ends of the four spoke arrangements 15, or the outer ends of the central webs 16 and of at least the lateral webs 17, merge into an annular disc edge 19. As can be seen especially clearly in FIG. 3, the disc edge 19, especially in the region of the ventilation apertures 5, is disposed, completely or almost completely, exactly parallel to the wheel axis R. The disc edge 19, as a circumferential part of the disc formed integrally from the starting blank for the disc part 10, connects all four spoke arrangements 15 to one another. The disc edge 19 forms the connecting part via which the disc part 10 is connected to the underside of a drop centre 2 of the rim part 1, preferably via a welded joint, in order to form a vehicle wheel. The outer, exposed edges 18' of two adjacent spoke arrangements 15, and the disc edge 19 disposed parallel to the wheel axis, delimit between two spoke arrangements 15 large-area ventilation apertures 5, which accordingly extend over the whole region between the edge webs 18 of two adjacent spoke arrangements 15 and the disc edge 19. In the vehicle wheel 50 according to the invention, the number of bolt holes 13 and the number of spoke arrangements 15 is four, and a given bolt hole 13 and a given spoke arrangement 15 lie mirror-symmetrically with respect to a common radial line R1. Accordingly, the vehicle wheel 50 has four ventilation apertures 5.

It can also be seen clearly in FIGS. 1 and 2 that the edge webs 18 oriented towards the same ventilation aperture 5 in each case merge with each other at the point of intersection with a radial line R2 which is disposed symmetrically between two bolt holes 13 or two adjacent spoke arrangements 15, and which therefore in each case bisects a ventilation aperture 5, viewed in the circumferential direction. The lateral webs 17 of adjacent spoke arrangements 15 also merge with one another on this radial line R2, and the disc part 10 has its greatest depth deformation along this radial line R2.

The individual spoke arrangements 15 narrow towards the outside radially in such a way that, at the narrowest point of each spoke arrangement 15, which coincides substantially with the region of transition between the spoke arrangements 15 and the disc edge 19 and is denoted by reference B' in FIG. 1, the width of each individual spoke arrangement 15 is equal to or preferably less than $1/12$ of the circumference of the disc part 10. By contrast, the varying width of each spoke arrangement 15, viewed in the circumferential direction, is indicated generally by reference B in FIG. 1. On the same reference circle around the wheel axis on which the individual spoke arrangements 15 have their narrowest width B', the ventilation apertures 5 correspondingly have their greatest arc length, which is indicated in FIG. 1 by reference L'. According to the invention, this greatest arc length L' is selected such that each ventilation aperture 15 extends over an arc length L' which is equal to or preferably greater than $1/6$ of the circumference of the disc part on the same reference circle on which L' and B' lie. All four ventilation apertures therefore together extend over $2/3$ or preferably more than $2/3$ of the circumference of the disc part 10. The four spoke arrangements 15 therefore together cover, at their smallest width B', less than ⅓ of the circumference of the wheel disc or of the disc edge. This has at the same time the result that the individual ventilation apertures 5 each extend over a maximum arc length L' which is preferably more than twice as great as the narrowest width B' of a spoke arrangement 15.

At the same time, each ventilation aperture 5 has its maximum radial clear width on the radial line R2, and therefore on the radial line which in each case bisects the ventilation apertures 5 and on which the edge webs 18 and the lateral webs 17 of adjacent spoke arrangements 15 merge into one another. The clear width W of each ventilation aperture 5 on the radial line R2 is in this case dimensioned such that it is equal to or preferably slightly greater than the radial width S of the metal portion in the central region of the disc part 11 on the same radial line R2; the radial width S of the metal portion of the disc 10 refers in this case to the width between the internal circumference of the central aperture 12 and the outside edge 18' on the radial line R2, where the definitions of the clear width W and of the radial width S of the disc part 10 relates to the plan view or projection of the wheel disc shown in FIG. 1 and to the sectional view in FIG. 3, respectively. In particular, it can be seen especially clearly from the sectional view in FIG. 3 that the wheel disc 10, as is apparent in the lower half of FIG. 3, has its greatest depth or depth deformation V between the underside of the central portion 11 and the upper side of the wheel disc on the radial line R2, while the central webs 16 of the individual spoke arrangements 15 are embossed approximately ⅓ less far outwards with respect to the underside of the hub connection face.

As can again be clearly seen in the sectional view of FIG. 3, each central web 16 extends parallel to the hub connection face and orthogonally to the wheel axis R over a relatively long radial partial section, the length of this partial section being denoted by reference T in FIG. 1. As a result, since all the spoke arrangements are identical, although offset circumferentially from one another, all the corresponding radial partial sections of the central webs 16 lie in a plane which runs perpendicularly to the wheel axis R. The length T, over which the central webs 16 of all the spoke arrangements 15 are disposed perpendicularly to the wheel axis R, is in each case longer than half the clear width W of a ventilation aperture and in this case is in the range 0.6≤T/W≤0.7, more precisely approximately 0.67. From the plan view in FIG. 1 and the perspective view in FIG. 2 it can also be clearly seen that the edge webs 18 have a depth X which changes continuously, viewed in the radial direction, at first increasing continuously, starting from the centre of the ventilation aperture, and then decreasing continuously again up to the spoke ends or the disc edge 19. At the same time, the distance A between the lateral webs 17 of a spoke arrangement 15 (or the width of the central webs 16) also changes within each spoke arrangement 15, which distance A, starting from the central portion 11 still encompassing the bolt holes 13, first decreases continuously and then increases again.

Figure 4:
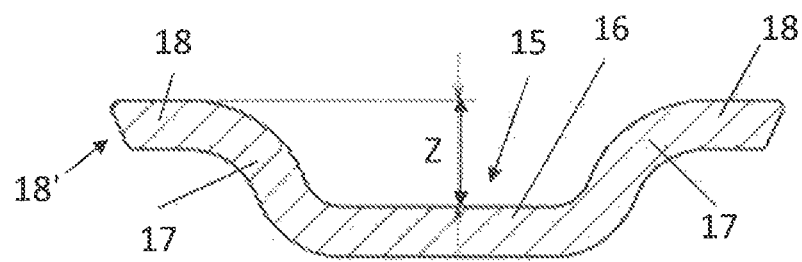
FIG. 4 shows schematically a section through one of the spoke arrangements.

The maximum relative deformation depth between the upper side of the central web 16 and the upper side of the edge web 18 is designated in FIG. 4 by reference Z and is preferably between 10 mm and 30 mm in the range of extent of the ventilation apertures, the minimum depth being greater than 10 mm in the region in which the central webs 16 are disposed plane-parallel to the hub connection face and perpendicularly to the wheel axis.

As can again be clearly seen in the plan view in FIG. 1, the outside edges 18' of the edge webs 18, starting from the disc edge 19, are disposed obliquely at an angle to the radial line R1, this oblique angle being from 6° to 10° and preferably being approximately 8°±1°. FIGS. 3 and 4 show further that the outside edges 18' of the edge webs 18 and the outside edges 19' of the disc edge 19 are in each case disposed obliquely with respect to the wheel axis R.

Figure 6:
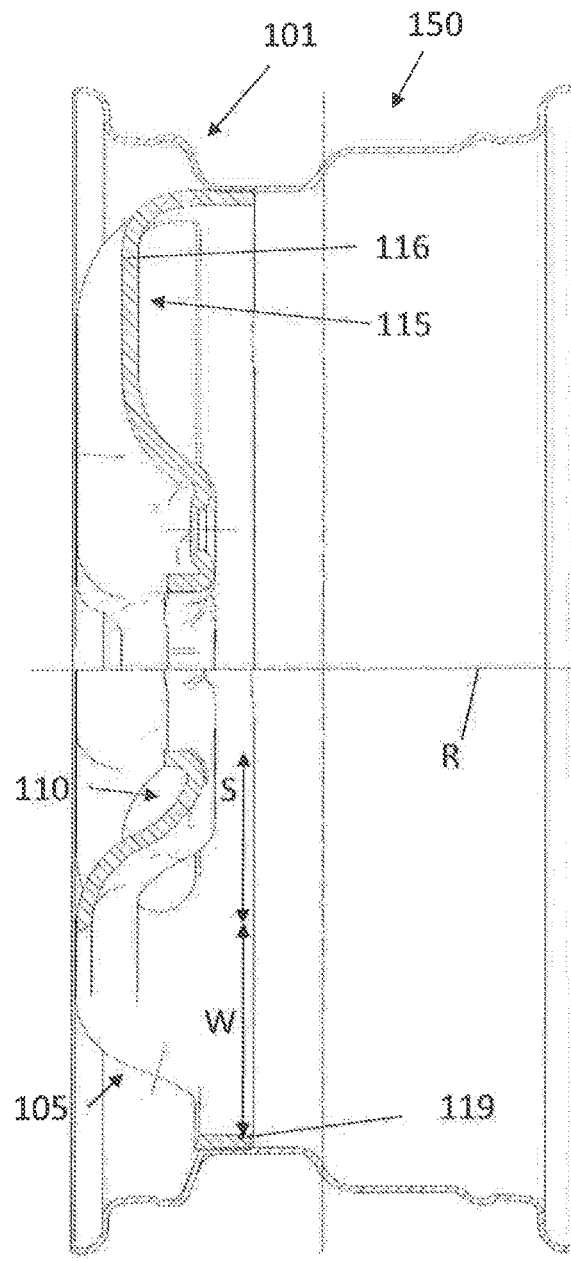
FIG. 6 shows the vehicle wheel of FIG. 5 in a sectional view along VI-VI in FIG. 5.
Figure 5:
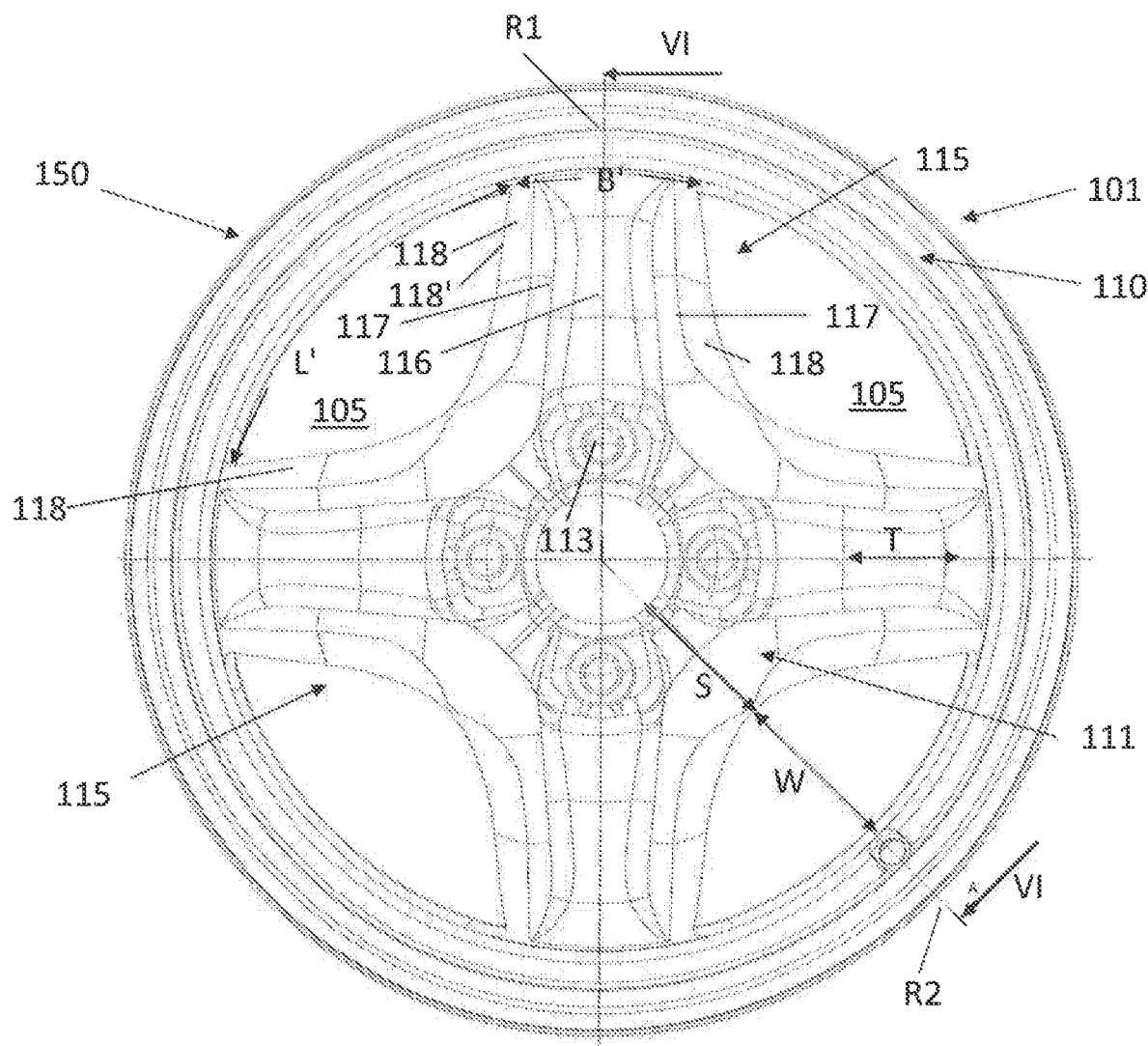
FIG. 5 shows a plan view of a vehicle wheel according to the invention in a second exemplary embodiment.

In the second exemplary embodiment of a wheel disc 150 as shown in FIGS. 5 and 6, the rim part 101 and the disc part 110 have almost the same structure as in the previous exemplary embodiment and the central portion 111 has, as in the previous exemplary embodiment, four bolt holes 113, in prolongation of which in each case extends a spoke arrangement 115 with central web 116, two lateral webs 117 which are bent towards the outside of the vehicle wheel 150 with respect to the central web 116, and two edge webs 118 which are each bent back again, with respect to the bend from central web 116 to lateral web 117, towards the rear side of a vehicle wheel 150. The edge webs 118 of adjacent spoke arrangements 115 border large-area ventilation apertures 105, and the disc edge 119 again runs exactly parallel to the wheel axis R in the region of the ventilation apertures 105. The radial width S of the metal portion of the disc part 110 and the clear width W of each ventilation aperture 105, and also the minimum width B' and the greatest arc length L' of the ventilation apertures 105 on the reference circle on which the minimum width B' of the spoke arrangements 15 is located, have practically the same values as in the previous exemplary embodiment, and L' is greater than ⅙ of the circumference of the disc part 110 on this wheel disc circumference. The radial partial length T, along which the central web 116 extends orthogonally with respect to the wheel axis R, is, however, considerably shorter than in the exemplary embodiment according to FIGS. 1 to 4, as can be seen especially clearly in FIG. 6, as a result of which a quotient T/W in the lower limit range of 0.6 is arrived at for the vehicle wheel 150.

For the person skilled in the art, the preceding description will yield numerous modifications which shall fall within the scope of protection of the appended claims. Although the arc length of the ventilation apertures is greater than ⅙ of the circumference of the disc part in all the preferred exemplary embodiments, the arc length may nevertheless also be equal to ⅙ of the circumference of the disc part or optionally even slightly less, without departing from the scope of protection of the appended claims. The central webs of the individual spoke arrangements might also be disposed slightly obliquely with respect to the wheel axis, even though the orthogonal orientation of the central webs is especially advantageous. The offset of the wheel disc in the rim part is in each case preferably selected such that the surfaces projecting furthest towards the outside of the wheel lie substantially flush with the outermost edge of the rim beads or further inwards, so that the disc part in no case projects beyond the rim part. Such and further modifications shall come within the scope of protection of the appended claims.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A vehicle wheel for passenger cars comprising: a rim part for receiving a tyre and a disc part which is connected to the rim part and is formed from a one-piece sheet metal blank by shaping and cutting or punching, which disc part includes a central portion having bolt holes for wheel bolts, a central aperture for a vehicle hub and a plurality of radially extending spoke arrangements, formed by shaping the sheet metal, for transmitting force between the vehicle hub and the rim part, each spoke arrangement having a generally U-shaped cross-section and being provided with a radially extending central web which merges on each side into a radially extending lateral web, bent outwardly from a radially extending plane of the central web over the entire radial length thereof, and then into an edge web bent back again with respect to the lateral web, radially outer ends of the central webs and of the lateral webs merging into a circumferential annular disc edge oriented precisely parallel or substantially parallel axially to a wheel axis and connecting all the spoke arrangements to one another, which disc edge is formed integrally from the sheet metal, forms a connecting part for the connection between the rim part and the disc part and delimits in each case, together with the edge webs of adjacent spoke arrangements, ventilation apertures which extend over a region between the edge webs and the disc edge, wherein the number of spoke arrangements is four and the number of bolt holes is four and a spoke arrangement and a bolt hole are in each case arranged mirror-symmetrically with respect to a common radial line, a width of each spoke arrangement constantly narrowing radially towards an outside, starting from the central portion, each ventilation aperture extending in a circumferential direction, at a narrowest point of the spoke arrangements, over an arc length of more than ⅙ of a circumference of the disc part, and each ventilation aperture having in a radial direction, on a radial line located midway between two adjacent spoke arrangements, a maximum radial clear width which is greater than a radial width of the metal portion of the disc part on the same radial line, wherein the ratio of the radial width to the clear width is from 0.85 to 0.95, wherein the outer edge webs extend offset to the central web and outside edges of the edge webs bordering the ventilation aperture in a radially outer region of the ventilation apertures are disposed obliquely with respect to the common radial line of bolt hole and spoke arrangement.

2. The vehicle wheel according to claim 1, wherein the central webs of all the spoke arrangements in each case extend, in a radial partial section, in the plane thereof which is disposed orthogonally to the wheel axis, the partial section having a length which is greater than half of the clear width of the ventilation apertures.

3. The vehicle wheel according to claim 2, wherein the quotient of the length of the partial section and the clear width is from 0.6 to 0.7.

4. The vehicle wheel according to claim 1, wherein the edge webs have a depth which, starting from the radial line disposed midway between two adjacent spoke arrangements, at first increases continuously and then decreases continuously again.

5. The vehicle wheel according to claim 1, wherein a distance between the lateral webs of a spoke arrangement, starting from the central portion in the direction of the outer spoke ends, at first narrows continuously and then widens again.

6. The vehicle wheel according to claim 1, wherein a maximum relative deformation depth between the central web and a transition of the lateral web to the edge web, in a range of extent of the ventilation apertures, is from 10 mm to 30 mm, a minimum depth being greater than 10 mm in the region of a radial partial length.

7. The vehicle wheel according to claim 1, wherein the outside edges of the edge webs bordering the ventilation aperture are disposed obliquely at an angle from 6' to 10'.

8. The vehicle wheel according to claim 1, wherein outside edges of the disc edge directly bordering the ventilation aperture are disposed obliquely with respect to the wheel axis.

\* \* \* \* \*

UNITED STATES PATENT AND TRADEMARK OFFICE
CERTIFICATE OF CORRECTION

PATENT NO. : 10,717,319 B2
APPLICATION NO. : 16/018251
DATED : July 21, 2020
INVENTOR(S) : Werner Kermelk, Karl Rode and Günter Stelzer Page 1 of 1

It is certified that error appears in the above-identified patent and that said Letters Patent is hereby corrected as shown below:

In the Claims

Column 8, Line 32 (Claim 7), reads:
--disposed obliquely at an angle from 6' to 10'.--.
Should read:
--disposed obliquely at an angle from 6° to 10°.--.

Signed and Sealed this
Third Day of November, 2020

Andrei Iancu
*Director of the United States Patent and Trademark Office*